J. C. VAN BERKEL.
MEAT HOLDER FOR MEAT CUTTING MACHINES.
APPLICATION FILED NOV. 23, 1915.
1,171,680.
Patented Feb. 15, 1916.
2 SHEETS—SHEET 1.
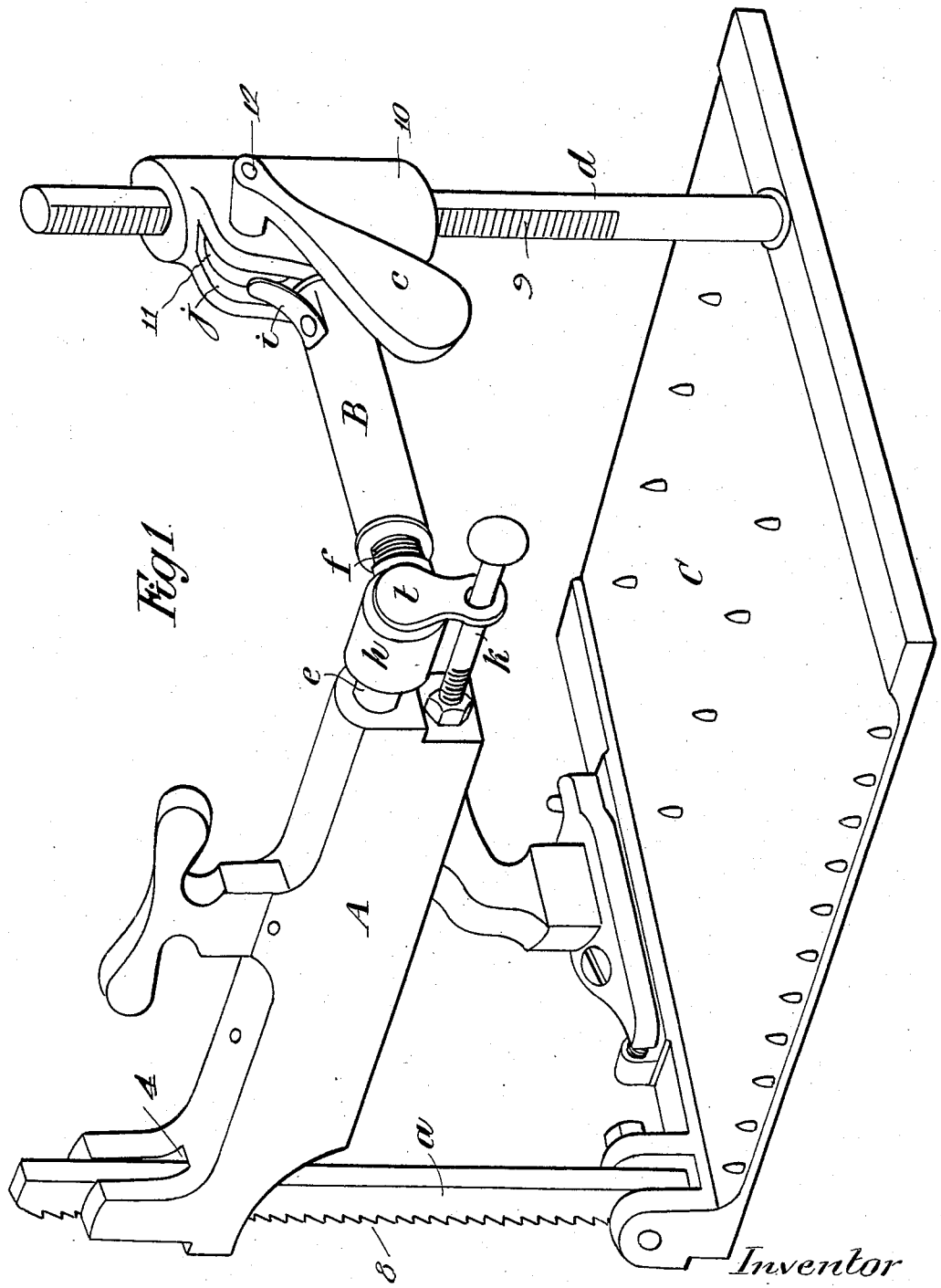
Inventor
Johannes C. van Berkel
By Paul Römelycke
Attorney.

J. C. VAN BERKEL.
MEAT HOLDER FOR MEAT CUTTING MACHINES.
APPLICATION FILED NOV. 23, 1915.
1,171,680.
Patented Feb. 15, 1916.
2 SHEETS—SHEET 2.
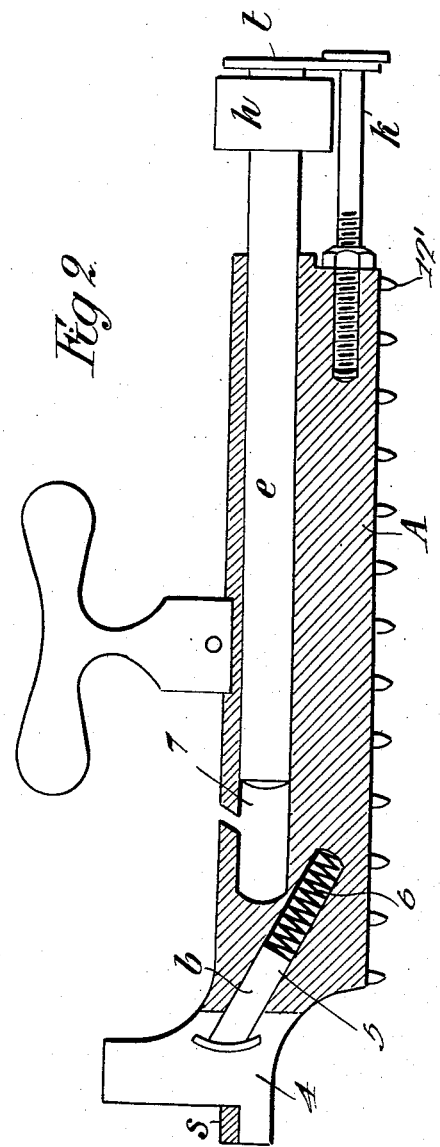
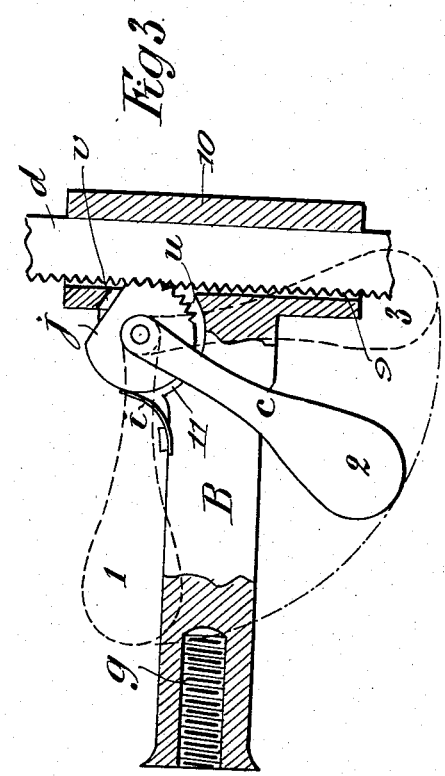
Inventor
Johannes C. van Berkel
By [signature]
Attorney.

UNITED STATES PATENT OFFICE.

JOHANNES CORNELIUS van BERKEL, OF COPENHAGEN, DENMARK.

MEAT-HOLDER FOR MEAT-CUTTING MACHINES.

1,171,680. Specification of Letters Patent. Patented Feb. 15, 1916.

Application filed November 23, 1915. Serial No. 62,975.

*To all whom it may concern:*

Be it known that I, JOHANNES CORNELIUS VAN BERKEL, manufacturer, subject of the Kingdom of the Netherlands, residing at No. 18 Vesterbrogade, in the city of Copenhagen, Denmark, have invented certain new and useful Improvements in Meat-Holders for Meat-Cutting Machines, of which the following is a specification.

This invention relates to an improvement in meat holders for meat cutting machines, and the object is to provide a device which can be manipulated by one hand of the operator while the meat is being placed beneath the device by the other hand.

The invention consists of a base or table having two posts or standards mounted thereon and at opposite sides of the table, and mounted on these posts or standards are arms, which are adjustably connected together at their inner ends. The outer ends of the arms are movably mounted on the posts and are capable of being held thereon against movement.

The invention consists of certain novel features of construction and combinations of parts which will be hereinafter described and pointed out in the claims.

In the accompanying drawings:—Figure 1 is a perspective view of the invention; Fig. 2 is a longitudinal vertical sectional view of the meat engaging arm; and Fig. 3 is a view partly in section and partly in elevation of the auxiliary arm.

C, represents the table or base of a meat cutting machine, which is provided with teeth or prongs for engaging the meat. Mounted on opposite sides of the base or table are toothed-standards or posts $a$ and $d$. The post or standard $a$ is pivotally connected to the base, and has its teeth 8 located on its outer surface.

A meat engaging arm A, extends crosswise of the table or base C, and is provided with a vertical slot 4 through which the post or standard $a$ extends. A transverse tooth $s$, is formed on the outer end of the arm A, which is adapted to engage one of the teeth 8 of the post or standard $a$, for supporting the arm, and for forming a pivot for the arm when the arm is swung vertically.

A diagonal opening 5 is formed in the arm A, along the inner wall of the slot 4 in which a stem $b$, is received. The stem $b$ is provided with a rounded head which is adapted to engage the inner side of the post or standard $a$, so that it is located opposite to the tooth $s$. The tooth $s$ and stem $b$ forming a locking engagement between the arm A and standard $a$. A spring 6 is located in the opening 5 which is adapted to force the stem $b$, outwardly causing it to engage the standard $a$. The rounded head of the stem permits the arm A to rock or swing upon the standard $a$, and as the arm is rocked the stem may be forced into the opening 5, as the slot 4 is of greater size than the standard. A longitudinal bore or opening 7 is formed in the arm A in which a bar $e$ is slidably mounted. The bar $e$ is provided with a head $h$ at its outer end, which has a screw-threaded pin $f$ connected thereto. The pin $f$ is received in a screw-threaded opening $g$ formed in an end of the auxiliary arm B, for adjustably connecting the inner ends of the arms together. A plate $t$ is connected to the bar $e$, and passing through the plate is a rod $k$, which has screw-threaded engagement with the outer end of the arm A. The rod $k$ is capable of adjustment, and is provided with an enlarged outer end which is adapted to be engaged by the plate $t$ for limiting the movement of the bar $e$.

The outer end of the auxiliary arm B has a sleeve 10 formed thereon through which the standard $d$ extends. A slot 11 is formed in the sleeve for the reception of a cam disk $j$ which is journaled on a stub-shaft 12 mounted on the arm B. A handle $c$ is connected to the shaft 12 for rotating the disk. The disk is provided with teeth $u$ on the periphery thereof, and a flat surface $v$. The teeth $u$ are adapted to travel over the teeth 9 of the standard $d$ and form an engagement between the standard and disk for locking the arms A and B against movement. A spring $i$ is connected to the arm B and is adapted to engage the disk $j$ for holding it in its adjusted positions.

When the meat holder or arms A and B are to be adjusted on the standards, the lever $c$ is swung to the position indicated at 1, in Fig. 3, so that the flat surface $v$ of the disk $j$ will be presented to the teeth 9 of the standard $d$ when the sleeve may slide in either direction on the standard. When the arm B and sleeve 10 are to be moved the arm A will swing on the tooth $s$, as a pivot but if the arm A is to be moved to a different elevation, the arm A will be forced outwardly against the stem $b$ until the tooth $s$ is out of engagement with the teeth 8 of the standard *a*, when the arm A can be moved in either direction on the standard *a* for obtaining the desired elevation.

After the arm A has been adjusted to the proper elevation, the auxiliary arm B is swung upwardly and the sleeve 10 is moved upwardly, the screw-threaded connection between the two arms A and B permitting the arm B to be swung without producing a binding action, until the meat is placed beneath the arms, and then the arms are lowered onto the meat, causing the teeth or pins 12′ of the arm A to be embedded into the meat. The lever *c* is now swung downwardly to the position indicated at 2, in Fig. 3, which causes an engagement of the teeth *u* with the teeth 9 of the standard *d*, and permits the sleeve 10 and arm B to be moved down by the continued movement of the lever, until the lever has moved a sufficient distance for firmly holding the meat on the table C. When the lever has been moved to its limit of movement indicated at 3, in Fig. 3, the meat is securely locked or fastened in place on the table C.

I claim:—

1. A meat holder, comprising a stationary toothed standard, an arm movably mounted thereon, a spring controlled disk mounted on the arm having a flat and a toothed face, and means for actuating the disk for bringing the teeth of the disk into engagement with the teeth of the standard for causing the arm to be moved longitudinally of the standard as the teeth of the disk travel along the teeth of the standard, and into or out of engagement with the meat, and for locking the arm against movement when moved to the desired position, said disk being adapted to be rotated to cause the flat face of the disk to be presented to the toothed surface of the standard to allow the arm to be moved freely on the standard.

2. A meat holder, comprising a table having standards thereon, an arm movably mounted on one of the standards, an auxiliary arm connected to said arm, and movably mounted on the other standard, said arms being movably connected together, said last mentioned standard having teeth thereon, a spring controlled disk mounted on the auxiliary arm having a flat and a toothed face, and means for actuating the disk for causing the teeth to be brought into engagement with the teeth of the standard for causing the auxiliary arm to be moved longitudinally of the standard, as the teeth of the disk travel along the teeth of the standard, to bring an arm into or out of engagement with the meat, and for locking the arms against movement, said disk being adapted to be rotated to cause the flat face of the disk to be presented to the toothed surface of the standard to allow the auxiliary arm to be moved freely on the standard.

3. A meat holder, comprising a table having toothed standards thereon, an arm movably mounted on one of the standards, means on the arm for engaging the teeth of the standard, and means on the arm for engaging the standard for connecting the arm to the standard, said arm being capable of oscillation on the standard, a bar having sliding engagement with the arm, means for limiting the movement of the bar, an auxiliary arm removably connected to said bar, and means carried by said auxiliary arm for connecting said arm to the other standard, and for holding the arms against movement.

In testimony whereof I affix my signature in presence of two witnesses.

JOHANNES CORNELIUS van BERKEL.

Witnesses:
MARCUS MÖLLER,
CHICK OWENS.